United States Patent [19]

Bartels

[11] Patent Number: 4,688,297
[45] Date of Patent: Aug. 25, 1987

[54] PROCESS FOR GAINING THE MEAT FROM POULTRY AND APPARATUS FOR PERFORMING THIS PROCESS

[75] Inventor: Alfred Bartels, Lübeck-Israelsdorf, Fed. Rep. of Germany

[73] Assignee: Nordischer Machinenbau Rud. Baader GmbH & Co KG, Lubeck, Fed. Rep. of Germany

[21] Appl. No.: 803,092

[22] Filed: Dec. 2, 1985

[30] Foreign Application Priority Data

Dec. 6, 1984 [DE] Fed. Rep. of Germany ....... 3444430

[51] Int. Cl.$^4$ ............................................. A22C 21/00
[52] U.S. Cl. ......................................... 17/46; 17/11; 17/16
[58] Field of Search ................................. 17/11, 56, 57

[56] References Cited

U.S. PATENT DOCUMENTS

| 4,557,017 | 12/1985 | Gasbarro | 17/11 |
| 4,564,976 | 1/1986 | Beech et al. | 17/11 |
| 4,567,624 | 2/1986 | van Mil | 17/11 |

*Primary Examiner*—Willie G. Abercrombie
*Attorney, Agent, or Firm*—Thomas R. Morrison

[57] ABSTRACT

In a process for removing the meat from the bodies of slaughtered poultry and an apparatus for performing the process, the starting product to be processed appropriately is a poultry body from which the wingbones (humerus) have been removed at the body joints and the legs by a cross-cut separating the pelvic region together with the legs and which is opened towards the back by cutting out the backbone. For improving the quality of the fillet particularly including the breast meat, it is suggested that the wishbone (furcula) connected to the body joints and obstructing the filleting process is cut free following the detaching of the meat from the breastbone (sternum), and that only then the fillets are completely separated while displacing the branches of the wishbone and the body joints towards the plane of symmetry of the poultry body.

15 Claims, 10 Drawing Figures

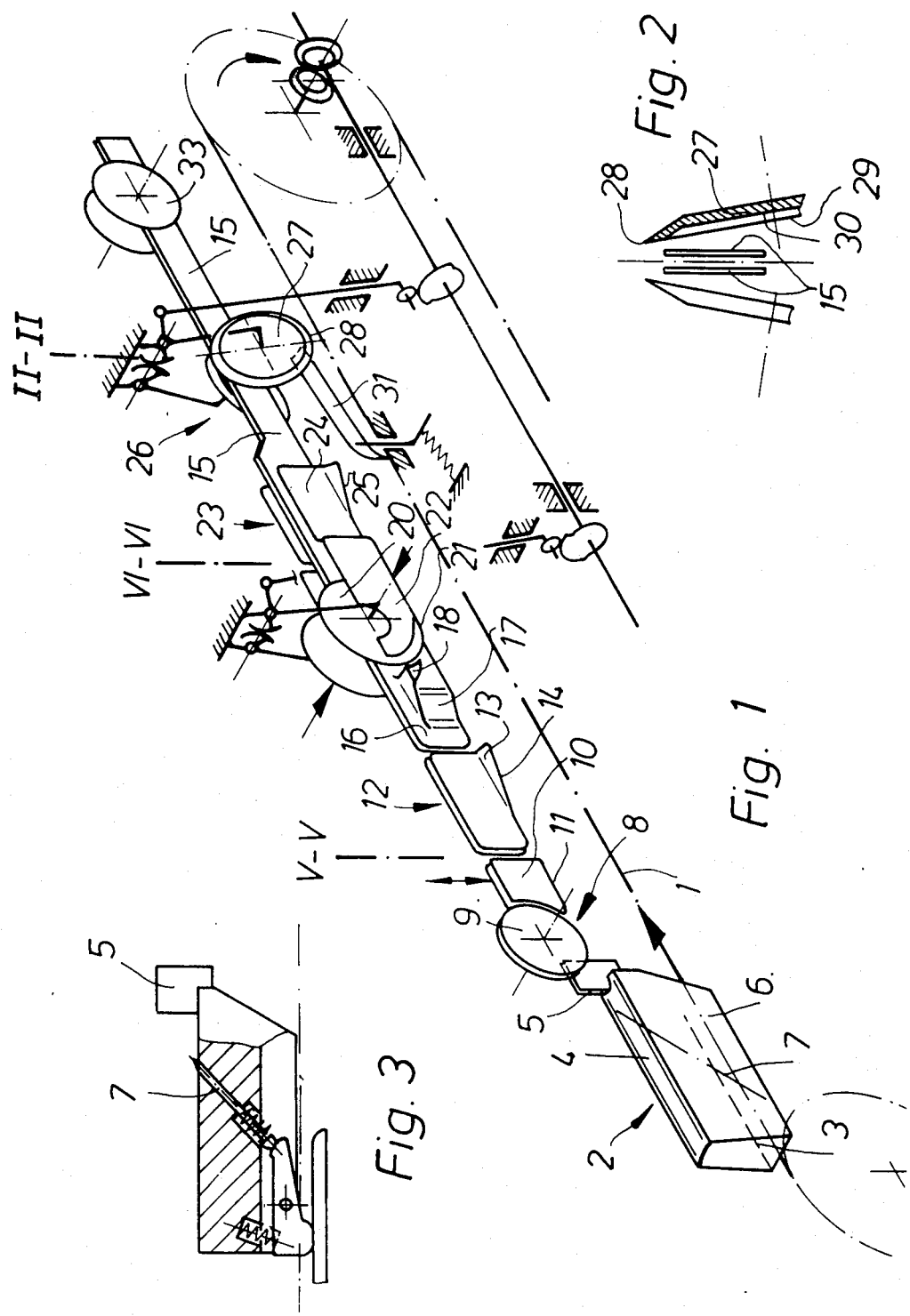

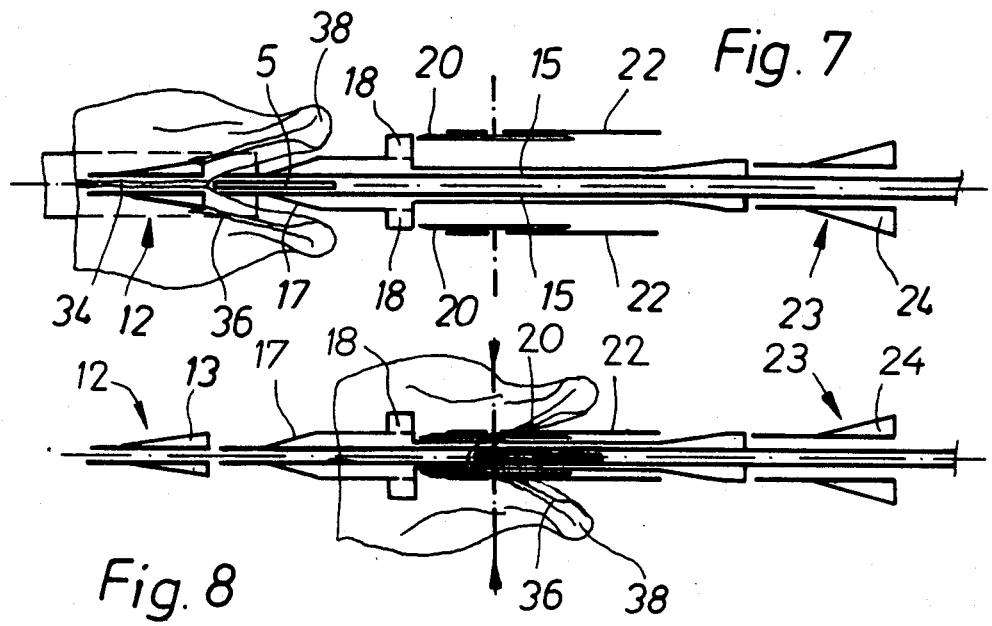
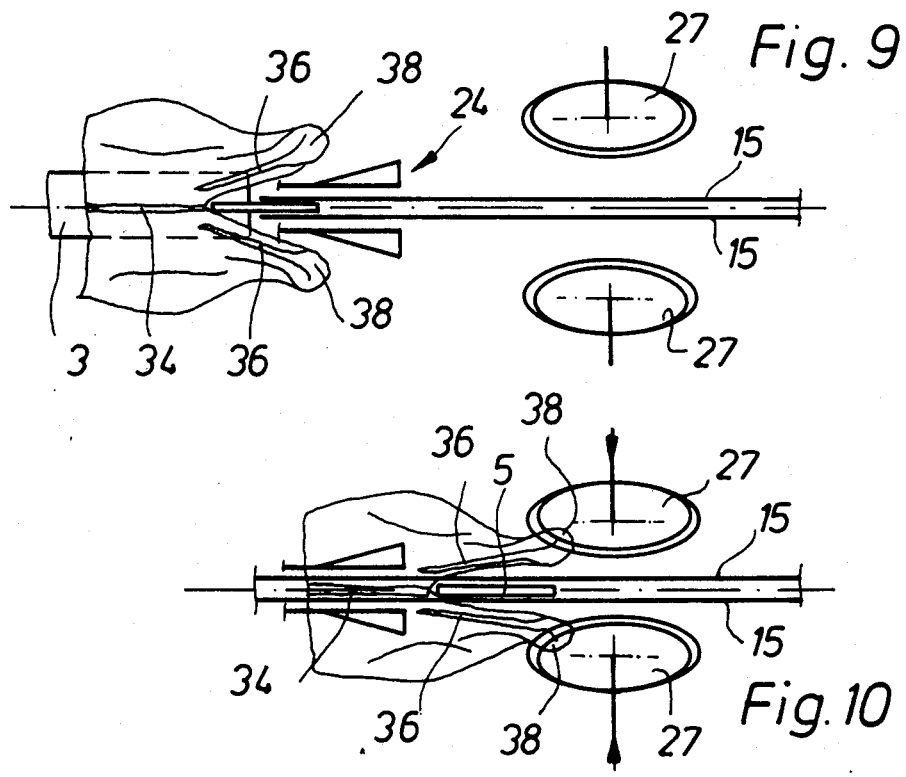

PROCESS FOR GAINING THE MEAT FROM POULTRY AND APPARATUS FOR PERFORMING THIS PROCESS

BACKGROUND OF THE INVENTION

1. Field of the Invention

The invention relates to a process for gaining the meat from the bodies of slaughtered poultry in the form of pieces, preferably in the form of fillets by mechanically detaching the meat pieces in successive operational steps starting in the vicinity of the breastbone (sternum), as well as to an apparatus for performing such process, the apparatus comprising a series of severing tools arranged in pairs for severing the meat from the breastbone and the ribs, and a driven conveyor with carriers, preferably in the form of saddles, which receive the poultry bodies, from which their extremities have been removed with the breastbone upwards and supporting on the inside thereof, and move them past the severing tools.

2. Prior Art

From German Utility Model 72 30 731 an apparatus is known, in which use is made of a conveyor with saddles for receiving the animal bodies to be processed in the abdominal cavity thereof. In this way each animal body is supplied to the processing operation for producing meat fillets, said product being obtained in that initially incisions are made in the plane of symmetry of the animal body by means of a pair of circular knives, starting from which incisions the fillets are scraped from the ribs surrounding the abdominal cavity by means of a pair of scrapers. This apparatus is used for processing fish.

An apparatus for gaining poultry breast meat adapted in accordance with the differences in the structure of the poultry body existing with respect thereto can be taken form EP-A No. 118 963. In this apparatus, the poultry bodies which have been freed from their extremities and which have been opened by removing the backbone are placed on saddles of a driven carrier disc in their abdominal cavity and are initially provided with incisions in the plane of symmetry of the body by means of a pair of circular knives, so as to detach the meat fillets from the crest of the breastbone. Starting from these incisions the fillets are then scraped partly from the ribs surrounding the abdominal cavity by means of pairs of scrapers and completely severed by means of a following pair of milling cutterlike rollers.

This procedure results in fillets with a very rough inner surface, which is looked upon as a quality-impairing feature, particularly when exhibiting fresh goods for sale.

3. Objects of the Invention

It is a main object of the present invention to obviate this deficiency and to subject the anatomical features obstructing the filleting process to a special processing before the fillets can be detached from the ribs. It is a further essential object of the invention to incorporate this special processing as a working step into the filleting process, so that poultry bodies prepared in the conventional manner can be processed.

SUMMARY OF THE INVENTION

In a process for gaining the meat from the bodies of slaughtered poultry in the form of pieces, preferably in the form of fillets by mechanically detaching the meat pieces in successive operational steps starting in the vicinity of the breastbone (sternum), these objects are achieved according to the invention in that together with detaching the meat from the breastbone the branches of the wishbone (claviculae or furcula) are severed, that the thus produced parts of the wishbone connected to the body joints of the wing or upper-arm bones (humerus) are pared out from the meat whilst displacing the same towards the plane of symmetry of the poultry body and that then the complete severing of the meat from the poultry body takes place whilst displacing the body joints of the wingbones towards the plane of symmetry of the poultry body.

For performing this process, there is provided an apparatus comprising a series of severing tools preferably arranged in pairs for severing the meat from the breastbone and the ribs, and a driven conveyor with carriers, which receive the poultry bodies, from which their extremities have been removed with the breastbone upwards and supporting on the inside thereof and move them past the severing tools, which apparatus, for achieving the above objects, is characterized in that first severing tools for detaching the meat from the breastbone are followed by a second cutting tool, comprising a pair of second circular knives arranged on either side of the rotary plane of the carriers, which knives with respect to their spacing from one another are controllable synchronously to the position of the carriers and symmetrically to the rotary plane thereof and extend with their cutting edges into the vicinity of the conveying path determined by supporting surfaces of the carriers and that as a third and final tool for severing the meat from the ribs there is provided a pair of driven third circular knives arranged in a roof-like manner with respect to each other, which knives with regard to their spacing from one another are controllable synchronously to the position of the carriers and symmetrically to the rotary plane thereof and act with their cutting edges in the region beside the flanks of the carriers.

The advantages which can be obtained thereby are in particular that the skeleton parts holding the meat in the front part of the skeleton are pared free and displaced in such a way that it is possible to detach the fillets from the ribs by filleting cuts performed in one plane.

According to a preferred embodiment of the invention, a pair of guides movable with respect to one another against the force of springs is associated to and arranged upstream of the third circular knives for the final severing of the fillets, which guides are provided in the planes of the third circular knives' inner faces facing each other and to extend into the vicinity thereof, and which keep the poultry bodies covered essentially in the area of the part of the ribs or the meat resting thereon located between the backbone and the hook extensions and act as cutting supports for the third circular knives.

Thus, the meat parts of limited thickness located in the vicinity of the back of the poultry body are left on the skeleton, so that the gained fillet is obtained with a clean outline.

It has provided that this operation may be facilitated if each third circular knife is provided on its inner face with a recess and/or if these circular knives are arranged in an offset manner with respect to the conveying plane of the carriers.

For the purpose of an accurate positioning and reliable holding of the slaughtered poultry body to be processed on the carriers, each of the latter may expediently be provided with a stop lug, in whose vicinity a locking pin is positioned therebehind for anchoring the poultry on the carrier. At the same time, this leads to a certain self-cleaning of the apparatus, in that the stop lug passes between the guides and the tools.

The holding of the poultry body is performed in a preferred manner in that the locking pin is guided in a support block of the carrier in a rising manner against the direction of movement of the carrier and is controlled shortly prior to the operating zone of the first severing tool to emerge from the supporting surface of the carrier and move into the poultry body in a burst-like manner. In order to be able to handle the completely pared-free skeleton with less problems for the purpose of gaining meat remnants still adhering thereto and particularly between the ribs with less problems in a separator process, the third tool can be followed by a further severing tool for severing the poultry body freed from the fillets on either side of the breastbone.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

FIG. 1 shows an axonometrical view of the complete machine in simplified form,

FIG. 2 shows a partial cross-section in the region of the last tool equipped with knives arranged in roof-like manner.

FIG. 3 shows a partial longitudinal section through the carrier.

FIG. 7 is a top view of the second cutting tool of FIG. 1 illustrated in one position of advance of the mechanism.

FIG. 8 is a top view corresponding to FIG. 8 at a second position of advance of the mechanism;

FIG. 9 is a top view of the final filleting tool of FIG. 1 illustrated in one position of advance of the mechanism.

FIG. 10 is a top view corresponding to FIG. 9 at a second position of advance of the mechanism.

DETAILED DESCRIPTION OF THE PREFERRED EMBODIMENT

Figure 4:
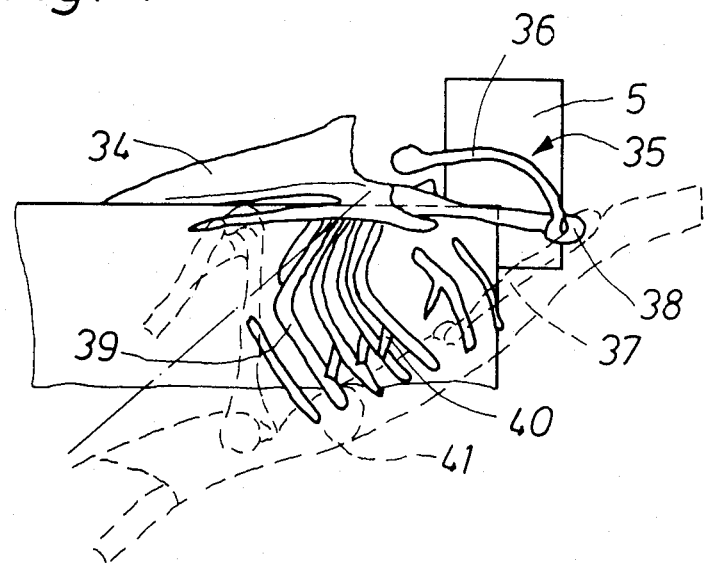
FIG. 4 shows the skeleton of a poultry body prepared for processing in the apparatus according to the invention, mounted on one of the carriers of the conveyor.
Figure 5:
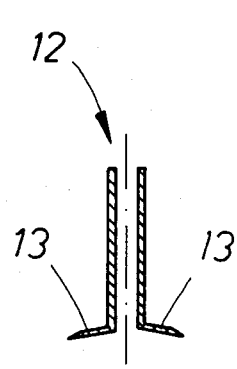
FIG. 5 is a cross section taken along V—VI in FIG. 1.
Figure 6:
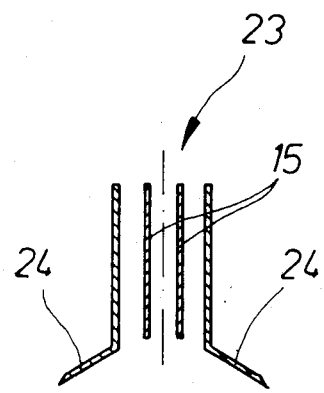
FIG. 6 is a cross section taken along VI—VI in FIG. 1.

In a not shown frame of an apparatus for gaining meat from the bodies of slaughtered poultry a conveyor 1 driven in a suitable manner to rotate endlessly is arranged. This conveyor 1 is equipped with equidistantly spaced carriers or saddles 2 for mounting and carrying the poultry bodies to be processed. Each carrier 2 comprises a support block 3 with a supporting surface 4 adapted to the anatomical features. A narrow stop lug 5 projects from said surface 4 at its front end. Each support block 3 has sides or flanks 6 extending parallel to its direction of movement and are inclined in roof-like manner towards one another under a shallow angle. As shown in FIG. 3, a locking pin 7 is provided within the support block 3. This pin 7 can be controlled to move in an inclined manner from the supporting surface 4 counter to the direction of movement of the support block. The pin 7 is held in retracted manner in the loading zone of the apparatus and immediately prior to the entry of carrier 2 into the operational zone of the apparatus is appropriately controlled to move into engagement with the skeleton.

The guides and processing tools are located above the conveying path defined by the supporting surfaces 4 of the carriers 2. They successively comprise a not shown pair of suitable entry or inlet guides for aligning the poultry body to be processed, followed by a severing or separating tool 8 with a pair of circular knives 9 for making incisions on either side of the crest-like web of breastbone 34. These knives 9 are followed by a pair of guides 10, which are displacable against spring force and engage in the incisions. Lower edges of these guides 10 are constructed as cutting edges 11, which lower increasingly towards the end thereof. Guides 10 pass over to a severing or separating tool 12 comprising a pair of scraping knives or scrapers 13 with plough-like diverging cutting or operation edges 14 also lowering with regard to the conveying path of carriers 2, said configuration being obtained by a slight roof-like arrangement of the knife blades relative to each other. The scrapers 13 are followed by a pair of guides 15 extending through the further operational stations and between which is guided the crest-like web of breastbone 34. In the vicinity of their inlet end 16 they are provided with a pair of deflectors, in particular deflector bars 17 for displacing (pushing) the cut-free meat away from the breastbone 34. Each deflector bar 17 is provided in its upper area with a simultaneously downwardly pushing, skid-like guide portion 18 for holding down the branches 36 of the wishbone 35 also separated by separating tool 8. The pair of deflector bars 17 forms the cutting counter-supports for a pair of driven circular knives 20 of a cutting tool 19. The circular knives 20 can be controlled appropriately during their operational phase as a function of the particular position of the particular carrier 2 symmetrically with respect to the rotary plane of conveyor 1 in the sense of reducing the distance between the circular knives 20. In the outer face of each of the latter is provided a transfer guide 22, whose lower edge is in each case level with the lowest point of the cutting edges 21 of said knives 20. In the close-up position of circular knives 20 the transfer guides 22 transfer or pass over to a further severing or separating tool 23 comprising a pair of scraping knives or scrapers 24. This tool is equipped with plough-like diverging cutting edges 25 lowering relative to the conveying path of carriers 2. This configuration is achieved by a roof-like arrangement of the knive-blades by a more pronounced inclination than that of the cutting tool 12. The spacing of the planes of scrapers 24 roughly corresponds to the maximum spacing of the cutting edges 14 of separating tool 12. The final filleting tool which follows the separating tool 23 is a tool 26 comprising a pair of driven circular knives 27 having cutting edges 28 arranged in a roof-like manner at an acute angle to one another, each of whose inner faces 29 is provided with a recess 30. During the operational phase the circular knives 27 can be controlled appropriately as a function of the position of the particular carrier 2 symmetrically to the rotary plane of conveyor 1 in the sense of reducing the spacing between the circular knives 27. The inclination angle of circular knives 27 is adapted to that of the sides 6 of support block 3 of carriers 2 and their narrowest position is chosen in such a way that a narrow passage is left between the sides 6 of support block 3 and the inner faces 29 of circular knives 27. Upstream of the latter a pair of guides 31 is arranged, each of which is held swivelled inwardly towards the path of carriers 2 under the tension of a spring 32, i.e. which are displacable by the carriers or a poultry mounted thereon. These guides 31 extend into the lower region of the inner faces 29 of circular knives 27 and on engaging on inner face 29 their upper edges act as a cutting counter-support. Finally there is a severing or separating tool 33 comprising a pair of driven circular knives, whose relative spacing roughly corresponds to the maximum spacing of the cutting edges 14 of separating tool 12 and whose depth of cut extends down directly to the plane of supporting surfaces 4 of carriers 2.

The apparatus functions in the following way:

A poultry body from which its extremities have been removed by separating the wingbone (humerus) at its body joints 38 and the legs by a cross-cut separating the pelvic region together with the legs and which has been opened towards the back by cutting out the backbone (vertebral column) 41 is placed on the support block 3 of a carrier 2 with he breastbone 34 upwards and the wishbone 35 leading. The poultry body is moved or shoved against the stop lugs 5, so that the forked head of the wishbone 35 engages therewith. During conveying, not shown guides settle on the poultry body for the external supporting and alignment thereof. Roughly at the same time the locking pin 7 in support block 3 is shot against the inside of the breastbone 34 by releasing retention mechanism by spring retension, the tip of pin 7 being buried in the tendons located there. As a result of the positive driving effect thus obtained the poultry body is supplied to the separating tool 8, whose circular knives 9 detach the breast meat from breastbone 34 on either side of the crest-like web thereof. Guides 10 engage in these incisions and their lower edges constructed as cutting edges 11 bring about a deepening of the cuts down to breatbone 34. Whilst also being introduced into said incisions, the scrapers 13 of separating tool 12 take over the guidance of the poultry body and remove the breast meat from the breastbone 34 roughly up to the start of the ribs 39. Guidance is maintained subsequently by the guides 15, which engage in the incisions on either side of the crest-like web of breastbone 34 and are responsible for this task throughout the remainder of the passage. The deflector bars 17 located on the sides of guides 15 in the vincinity of their inlet ends 16 effect an outward displacement of the already detached breast meat, together with the branches 36 of the wishbone 35 also separated by separating tool 8. The branches 36 pass under the skid-like guide portions 18 and are simultaneously held down in the direction of supporting surface 4 of carrier 2. In this way it is possible for the circular knives 20 of cutting tool 19 with their widest possible relative spacing to make incisions in the vicinity of the outer edges of branches 36 of wishbone 35 and to remove or pare the same from the breast meat. Directly following this operation, the circular knives 20 are controlled in the sense of reducing their relative spacing. This has the effect that the released or pared-free branches 36 of the wishbone 35 are displaced inwardly in the direction of the sides of guides 15 and the circular knives 20 run without any further function in the previously made incisions. The transfer guides 22 flanking the circular knives 20 on the outside pass over to the separating tool 23, which ensures the detaching of the breast meat from ribs 39 in the region of the starting points thereof on breastbone 34. The thus prepared poultry body now meets tool 26. Before this, guides 31 have pressed the sides of the poultry body against the sides 6 of the support block 3 of carrier 2 under the tension of springs 32. The circular knives 27 of tool 26 assume their widest possible position on the arrival of the saddle, so that their cutting planes enclose between them the body joints 38 of the wingbone. Immediately following this, the circular knives 27 are moved towards one another, so that said body joints 38 are pushed inwards in the direction of the sides of guides 15. The circular knives 27 are able to detach from the central parts of the ribs the fillet meat by a smooth cut guided in one plane, the body joints 38 being housed in recess 30 on the inner face 29 of circular knives 27. During this cut, the upper edges of guides 31 act as a cutting counter-support and as a cut limitation. This has the result that the fillets have a clean outline. By means of separating tool 33, it is possible to remove the breastbone 34 from the remaining carcass, so that flat body parts enclosing the ribs are obtained. These parts can be used without any difficulty for a following separating process by means of continuous belt separators.

What is claimed is:

1. A process for detaching meat from bodies of slaughtered poultry having a skeleton defining a plane of symmetry and including at least a breastbone (sternum), a wishbone (claviculae or furcula) defining branches, wing (upper-arm) bones (humerus) attached to said skeleton via body joints, a backbone, ribs, and hook extensions on the latter, the succession of operational steps starting in the vicinity of said breastbone comprising (a) separating said branches of said wishbone into branch parts;
    (b) detaching the meat from said breastbone;
    (c) paring the thus produced branch parts of said wishbone connected to said body joints of said wingbone from the meat while displacing said branch parts toward said plane of symmetry, and;
    (d) completely separating the meat from said poultry body while displacing said body joints of said wingbone toward said plane of symmetry.

2. An apparatus for performing a process as claimed in claim 1, said apparatus comprising (a) driven conveyor means provided with carriers which receive said poultry bodies from which their extremities have been removed with sid breastbone upwards and supporting on the inside thereof and move them; past a series of severing tools,
    (b) first severing tool means for detaching the meat from said breastbone,
    (c) second cutting tool means downstream of said first severing tool means and comprising a second pair of circular knife means arranged on either side of a plane of rotation defined by said carriers, which second pair of circular knife means with respect to their spacing from one another are controllable synchronously to the position of said carriers and symmetrically to said plane of rotation thereof and extend with cutting edges formed on them into the vicinity of a conveying path defined by supporting surfaces of said carriers, and (d) third tool means for severing the meat from said ribs and arranged downstream of said second cutting tool means, said third tool means comprising driven third circular knife means arranged in a roof-like manner with respect to each other, which third circular knife means with regard to their spacing from one another are controllable synchronously to the position of said carriers and symmetrically to said plane of rotation and act with cutting edges formed on them in the region besides flanks formed on said carriers.

3. An apparatus as claimed in claim 2, said apparatus further comprising a pair of guides resiliently movable with respect to one another, which guides are associated to and arranged upstream of said third circular knife means, which guides are provided in the planes of inner faces formed on said circular knife means and facing each other, and to extend into the vicinity thereof, and which guides keep the poultry bodies covered essentially in an area of that part of said ribs or the meat thereon between said backbone and said hook extensions and act as cutting supports for said third circular knife means.

4. An apparatus as claimed in claim 2, wherein each of said third circular knife means is provided with a recess on its inner face.

5. An apparatus as claimed in claim 2, wherein said third circular knife means are offset with respect to a conveying plane defined by said carriers.

6. An apparatus as claimed in claim 4, wherein said third circular knife means are offset with respect to a conveying plane defined by said carriers.

7. An apparatus as claimed in claim 2, wherein each of said carriers is provided with a stop lug, closely behind which is provided a locking pin for anchoring said poultry body on said carrier.

8. An apparatus as claimed in claim 7, wherein said locking pin is guided in a support block forming part of said carrier in a rising manner against the direction of movement thereof and is controlled shortly prior to the operating zone of said first severing tool means to emerge from said supporting surface of said carrier and move into the poultry body in burst-like manner.

9. An apparatus as claimed in claim 2, wherein a further severing tool for severing the poultry body freed from the fillets on either side of the breastbone is arranged downstream of said third tool means.

10. An apparatus as claimed in claim 3, wherein a further severing tool for severing the poultry body freed from the fillets on either side of the breastbone is arranged downstream of said third tool means.

11. An apparatus as claimed in claim 4, wherein a further severing tool for severing the poultry body freed from the fillets on either side of the breastbone is arranged downstream of said third tool means.

12. An apparatus as claimed in claim 5, wherein a further severing tool for severing the poultry body freed from the fillets on either side of the breastbone is arranged downstream of said third tool means.

13. An apparatus as claimed in claim 6, wherein a further severing tool for severing the poultry body freed from the fillets on either side of the breastbone is arranged downstream of said third tool means.

14. An apparatus as claimed in claim 7, wherein a further severing tool for severing the poultry body freed from the fillets on either side of the breastbone is arranged downstream of said third tool means.

15. An apparatus as claimed in claim 8, wherein a further severing tool for severing the poultry body freed from the fillets on either side of the breastbone is arranged downstream of said third tool means.

* * * * *